US012280362B2

United States Patent
Lu et al.

(10) Patent No.: US 12,280,362 B2
(45) Date of Patent: Apr. 22, 2025

(54) BISMUTH IODIDE OXIDE / ZINC OXIDE COMPOSITE AND PREPARATION METHOD THEREFOR AND APPLICATION THEREOF IN PIEZOELECTRIC PHOTOCATALYTIC REMOVAL OF ORGANIC POLLUTANTS

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 647 days.

(21) Appl. No.: 17/624,111

(22) PCT Filed: Nov. 8, 2020

(86) PCT No.: PCT/CN2020/127394
§ 371 (c)(1),
(2) Date: Dec. 30, 2021

(87) PCT Pub. No.: WO2021/089031
PCT Pub. Date: May 14, 2021

(65) Prior Publication Data
US 2022/0347660 A1    Nov. 3, 2022

(30) Foreign Application Priority Data
Nov. 8, 2019 (CN) .......................... 201911089784.9

(51) Int. Cl.
*B01J 23/06*     (2006.01)
*B01J 23/18*     (2006.01)
(Continued)

(52) U.S. Cl.
CPC ............... *B01J 27/06* (2013.01); *B01J 23/06* (2013.01); *B01J 35/19* (2024.01); *B01J 35/23* (2024.01);
(Continued)

(58) Field of Classification Search
CPC .................................. B01J 23/06; B01J 23/18
(Continued)

(56) References Cited

FOREIGN PATENT DOCUMENTS

| CN | 106525942 A | 3/2017 |
|---|---|---|
| CN | 109999859 A | 7/2019 |

(Continued)

OTHER PUBLICATIONS

CN-110075876-A. Wang L. et al. "Preparation of zinc oxide-bismuth iodide oxide composite microsphere involves suspending nano zinc oxide in ethylene glycol, dissolving bismuth(III) nitrate pentahydrate and potassium iodide, adding acetic acid, and suction filtering". (Year: 2019).*

(Continued)

*Primary Examiner* — Cam N. Nguyen
(74) *Attorney, Agent, or Firm* — SZDC Law PC

(57) ABSTRACT

A bismuth iodide oxide/zinc oxide composite material, a preparation method therefor and an application thereof in piezoelectric photocatalytic removal of organic pollutants. The conductive substrate spin-coated with a zinc oxide seed solution is annealed and added to the precursor solution for reaction to obtain a zinc oxide nanorod array (ZnO NRs); the zinc oxide nanorod array is added into a bismuth iodide precursor solution for reaction to obtain the bismuth iodide oxide/zinc oxide composite material (BiOI/ZnO NAs). The composite material is put into an aqueous solution containing bisphenol A, adsorption is performed in the dark for half an hour, and then ultrasound and visible light are used together to remove organic pollutants in the water. After (Continued)

piezoelectric photocatalytic degradation of 90 minutes, bisphenol A in the aqueous solution is almost completely degraded.

7 Claims, 2 Drawing Sheets

(51) Int. Cl.
  *B01J 27/06* (2006.01)
  *B01J 35/00* (2006.01)
  *B01J 35/23* (2024.01)
  *B01J 35/39* (2024.01)
  *B01J 37/03* (2006.01)
  *B01J 37/04* (2006.01)
  *C02F 1/32* (2023.01)
  *C02F 1/72* (2023.01)
  *C02F 101/34* (2006.01)

(52) U.S. Cl.
  CPC ............ *B01J 35/39* (2024.01); *B01J 37/031* (2013.01); *B01J 37/04* (2013.01); *C02F 1/32* (2013.01); *C02F 1/725* (2013.01); *C02F 2101/345* (2013.01); *C02F 2305/08* (2013.01); *C02F 2305/10* (2013.01)

(58) Field of Classification Search
  USPC ........................................................ 502/343
  See application file for complete search history.

(56) References Cited

FOREIGN PATENT DOCUMENTS

| CN | 110416531 A | * 11/2019 | ............ H01M 10/36 |
| CN | 110841668 A | 2/2020 | |

OTHER PUBLICATIONS

CN-110180488-A. Wang L. et al. "Preparing highly adsorbed active bismuth iodide oxide comprises e.g. adding cerium nitrate or barium nitrate hydrate, polyethylene glycol, trimesic acid, N,N-dimethylformamide and watersoluble iodine salt to deionized water, and mixing". (Year: 2019).*

CN-110416531-A. Gou, Lei et al. "Halogenated bismuth oxychloride aqueous zinc-ion secondary battery positive electrode and preparation method and application thereof". (Year: 2019).*

CN-109999859-A. Wang L. et al. "Preparation of zinc-oxide bismuth iodide oxide composite material for photocatalytic degradation, involves dispersing zinc oxide and dihydrogen phosphate in ethanol solution, and dissolving bismuth salt and iodide salt in dispersant". (Year: 2019).*

Jiang et al. "ZnO/BiOI Heterostructures: Photoinduced Charge-Transfer Property and Enhanced Visible-Light Photocatalytic Activity", J. Phys. Chem. C 2011, 115, 20555-20564. (Year: 2011).*

C Zhang et al., "p-n Heterojunction of BiOI/ZnO nanorod arrays for piezo-photocatalytic degradation of bisphenol A in water" Journal of Hazardous Materials 399 (2020) 123109 (Jun. 10, 2020).

* cited by examiner

BISMUTH IODIDE OXIDE / ZINC OXIDE COMPOSITE AND PREPARATION METHOD THEREFOR AND APPLICATION THEREOF IN PIEZOELECTRIC PHOTOCATALYTIC REMOVAL OF ORGANIC POLLUTANTS

This application is the National Stage Application of PCT/CN2020/127394, filed on Nov. 8, 2020, which claims priority to Chinese Patent Application No. 201911089784.9, filed on Nov. 8, 2019, which is incorporated by reference for all purposes as if fully set forth herein.

FIELD OF THE INVENTION

The invention relates to the technical field of nanocomposites and piezoelectric photocatalysis, in particular to a preparation method of one-dimensional zinc oxide nanorod array and two-dimensional bismuth iodide oxide nanocomposites and their application in the effective removal of water pollutants by piezoelectric photocatalysis.

BACKGROUND OF THE INVENTION

Environmental pollution and destruction and the shortage of clean energy are the most serious problems facing the world. How to effectively deal with environmental pollution has become a global research hotspot. Photocatalytic technology is a major progress in this field. It is a sustainable, harmless and economically feasible advanced technology. This technology can use the inexhaustible, safe and clean energy from the sun. However, ZnO exhibits UV response due to the wide band gap, which greatly reduces the utilization efficiency of sunlight.

SUMMARY OF THE INVENTION

The object of the invention is to provide a composite material responsive to visible light, which can quickly and effectively degrade pollutants in water through ultrasonic-photocatalytic synergy. Taking bisphenol A as the target organic pollutant, the catalytic performance of the composite prepared by the invention is studied. The bismuth iodide oxide/zinc oxide composite material disclosed by the invention forms an electric field inside it under the action of external force, effectively separates free carriers, inhibits the recombination of carriers, realizes the catalytic degradation of organic pollutants under the condition of no light, improves the degradation performance through photocatalysis and piezoelectric catalysis, and the material is excited to generate photogenerated electron hole pairs under the joint action of external force and light, which quickly and effectively separated when passing through the piezoelectric internal electric field, and the photocatalytic performance is enhanced. It has chemical stability, high reactivity and piezoelectric properties, and has excellent application value in the field of photocatalysis and piezoelectric catalysis.

In order to achieve the above object, the specific technical scheme of the invention is as following:

A bismuth iodide oxide/zinc oxide composite, the preparation method thereof comprising the following steps:
1) annealing a conductive substrate spin-coated with a zinc oxide seed solution and adding it into a precursor solution for reaction to obtain a zinc oxide nanorod array (ZnO NRs);
2) placing the zinc oxide nanorod array into a bismuth iodide oxide precursor solution for reaction to obtain the bismuth iodide oxide/zinc oxide composite (BiOI/ZnO NAs).

The present invention discloses a degradation method of organic pollutants, comprising the following steps:
1) annealing a conductive substrate spin-coated with a zinc oxide seed solution and adding it into a precursor solution for reaction to obtain a zinc oxide nanorod array (ZnO NRs);
2) placing the zinc oxide nanorod array into a bismuth iodide oxide precursor solution for reaction to obtain the bismuth iodide oxide/zinc oxide composite (BiOI/ZnO NAs);
3) placing the bismuth iodide oxide/zinc oxide composite in a solution containing organic pollutants, and the degradation of organic pollutants is realized under the combined action of ultrasound and light.

In the present invention, in step (1), the zinc oxide seed solution is composed of zinc salt aqueous solution and amine compound aqueous solution. Preferably, the concentration of zinc salt aqueous solution is (0.14-0.15) g/mL and the concentration of amine compound aqueous solution is (0.07-0.071) g/mL; the precursor solution is composed of water-soluble zinc salt, amine compound and water. Preferably, the mass ratio of water-soluble zinc salt, amine compound and water is (0.74-0.75):(0.35-0.36):100. The raw materials of the zinc oxide seed solution and precursor solution of the invention are the same, but the concentrations are different. Preferably, the water-soluble zinc salt is zinc nitrate hexahydrate and the amine compound is hexamethylene tetramine.

In the invention, in step (1), the conductive substrate is indium tin oxide (ITO) glass; the annealing treatment is to keep the temperature at 300-350° C. for 10-35 minutes in air atmosphere, with a heating rate of 4-6° C./min, preferably keep the temperature at 320° C. for 30 minutes in air atmosphere, with a heating rate of 5° C./min; the reaction is to react at 80-120° C. for 5-9 h, preferably at 90° C. for 6 h.

In the invention, in step (2), the bismuth iodide oxide precursor solution is composed of water-soluble bismuth salt, iodide salt and organic solvent. Preferably, the dosage ratio of water-soluble bismuth salt and organic solvent is (48-49) mg:40 mL; the water-soluble bismuth salt, iodide salt and organic solvent are bismuth nitrate pentahydrate, potassium iodide and ethylene glycol monomethyl ether respectively.

In the invention, in step (2), the reaction is to react at 120-180° C. for 10-15 h, preferably at 160° C. for 12 h.

In the invention, the mole ratio of Bi and Zn in the bismuth iodide oxide/zinc oxide composite is 10%-20%.

In the invention, in step (3), the organic pollutant is bisphenol A; the light is visible light; and the ultrasonic power is 90 W.

The preparation method of bismuth iodide oxide/zinc oxide composite comprises the following steps:
1) Preparation of ZnO nanorod arrays: first, spining a layer of zinc oxide seed layer on the conductive surface of the cleaned indium tin oxide (ITO) glass, and then annealing the spin-coated ITO glass under the air atmosphere of 300-350° C. for 10-35 minutes; then placing the annealed ITO glass obliquely into the reactor with the conductive surface downward, adding the precursor solution, i.e. zinc nitrate and hexamethylene tetramine aqueous solution, reacting at 80-120° C. for 5-9 hours, and taking out the ITO glass after the reaction, washing by deionized water and drying to obtain a zinc oxide nanorod arrays (ZnO NRs);
2) Preparation of bismuth iodide oxide/zinc oxide composite nano-array: configuring a 1:1 molar ratio of bismuth nitrate pentahydrate and potassium iodide in ethylene glycol monomethyl ether solution, stirring vigorously for 15-30 minutes, and then pouring into a 50 ml reaction kettle, inserting the ITO glass with of the zinc oxide nanorod array into the reaction kettle obliquely with the conductive surface downwards, sealing and reacting at 120-180° C. for 10-15 h. After natural cooling, taking out the ITO glass, washing with deionized water, and drying to obtain the bismuth iodide oxide/zinc oxide composite nano-array (BiOI/ZnO Nas).

Piezoelectric synergistic photocatalytic degradation experiment: put the above nano array materials into the aqueous solution containing bisphenol A, avoid light and absorb for half an hour, and then act together with ultrasound and visible light to remove organic pollutants in water.

Advantages of the Invention

1. The invention discloses a bismuth iodide oxide/zinc oxide composite (BiOI/ZnO NAs) grown on ITO conductive glass, which has simple synthesis method and regular morphology; the raw materials used are common and easy to obtain; the base ITO conductive glass has good conductivity, which can promote the electron hole pair transfer and diffusion of the composite and effectively improve the photocatalytic performance;

2. The invention discloses a bismuth iodide oxide/zinc oxide composite (BiOI/ZnO NAs) grown on ITO conductive glass. Because it is grown on ITO glass, it is very convenient to recover the catalyst after photocatalytic degradation experiment. It can be recycled only by cleaning with clean water;

3. The invention discloses a bismuth iodide oxide/zinc oxide composite (BiOI/ZnO NAs) grown on ITO conductive glass, zinc oxide has good piezoelectric properties, and the introduction of ultrasonic assistance can effectively improve the photocatalytic performance, especially the rod zinc oxide has the best performance; after loading bismuth iodide oxide, expand the light response range of the composite and make full use of visible light; at the same time, sheet bismuth iodide oxide can provide rich active sites to further promote the degradation activity.

DETAILED DESCRIPTION OF THE INVENTION

Figure 1:
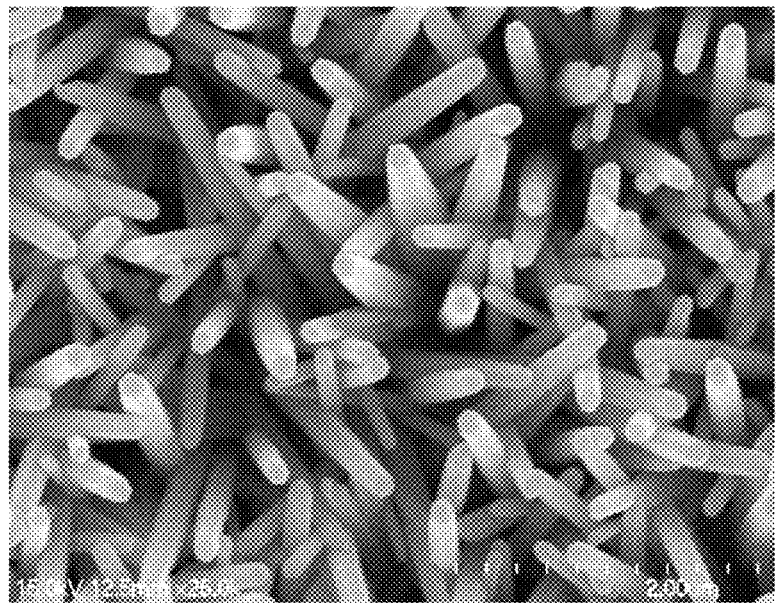
FIG. 1 is a scanning electron microscope diagram of zinc oxide nanorod arrays (ZnO NRs).

The invention grows zinc oxide nanorod array on indium tin oxide glass substrate by simple hydrothermal method, and then loads two-dimensional bismuth iodide oxide nano sheet on the surface of one-dimensional zinc oxide nanorod by solvothermal method, so as to achieve the purpose of adjusting the band gap of composite material so that it can absorb visible light. Through the combination of photocatalyst bismuth iodide oxide and piezoelectric catalyst zinc oxide, the built-in electric field of piezoelectric materials is used to promote the migration and separation of photogenerated charges and inhibit the recombination of charges, so as to improve the photocatalytic activity of the composites, so as to degrade organic pollutants in water quickly and efficiently.

In the present invention, the preparation method of the bismuth iodide oxide/zinc oxide composite is as follows:
1) annealing a conductive substrate spin-coated with a zinc oxide seed solution and adding it into a precursor solution for reaction to obtain a zinc oxide nanorod array (ZnO NRs);
2) placing the zinc oxide nanorod array into a bismuth iodide oxide precursor solution for reaction to obtain the bismuth iodide oxide/zinc oxide composite (BiOI/ZnO NAs).

Different from the prior art, the zinc oxide nanorod array is added to the solution containing bismuth and iodine at the same time, rather than adding step by step, and the product has good performance.

Embodiment 1

Preparation of zinc oxide seed layer on ITO glass, the specific steps are as follows:

First, ITO conductive glass ($1.5*3$ cm$^2$) is washed with a mixture of ethanol, acetone and deionized water (the volume ratio is 1:1:1) in an ultrasonic instrument for 30 minutes, then dissolve 0.7437 g of zinc nitrate hexahydrate and 0.3505 g of hexamethylene tetramine in 5 ml of deionized water separately to obtain zinc nitrate aqueous solution and hexamethylene tetramine aqueous solution respectively; take clean ITO glass and put it on the spin coating instrument, and drop about 1 ml of the above zinc nitrate aqueous solution and hexamethylene tetramine aqueous solution on the conductive surface of ITO glass successively, spin coating at 2000 rpm for 30 s, and then stand for 5 minutes; After the above operations are completed, dry and put into the tubular furnace, keep the temperature at 320° C. for 30 minutes in air atmosphere, and the heating rate is 5° C./min (room temperature to 320° C.).

Embodiment 2

The specific steps for the preparation of ZnO nanorod arrays are as follows:

Weigh 0.7437 g of zinc nitrate hexahydrate and 0.3505 g of hexamethylene tetramine and dissolve them in 50 ml of deionized water respectively. After stirring for 10 minutes, mix them and continue stirring for 10 minutes to obtain the precursor solution (the concentration is 25 mM); the ITO conductive glass with ZnO seed layer prepared in embodiment 1 is obliquely inserted into the inner tank of the reactor with the conductive surface facing down, the angle is about 60°, the precursor solution is poured into the inner tank of the reactor, the volume is about 80% of the inner tank capacity, sealed, and put into the oven at 90° C. for reaction for 6 hours. Cool naturally, open the reactor, take out the ITO glass, and wash its front and back sides with deionized water and ethanol, dry to obtain zinc oxide nanorod arrays for use in embodiments 3 to 5.

FIG. 1 is a scanning electron microscope diagram of the above ZnO nanorod array. It can be clearly seen from the figure that the ZnO nanorod array is in a regular, orderly and vertically arranged structure.

Embodiment 3

Preparation of bismuth iodide oxide/zinc oxide nano array composite (10% BiOI/ZnO), the specific steps are as follows:

Weigh 48.5 mg of bismuth nitrate pentahydrate and 16.6 mg of potassium iodide and dissolve them in 40 mL of ethylene glycol monomethyl ether (the concentration is 2.5 mM), stir vigorously for 25 minutes, move it into the inner tank of the reactor, obliquely insert ITO glass with zinc oxide nanorod array into the inner tank of the reactor with the conductive surface downward at an angle of about 60°, seal it, and put it into the oven for reaction at 160° C. for 12 hours. After natural cooling, take out ITO glass, wash it with deionized water and ethanol, and dry it in the oven at 60° C. for 6 hours to obtain a composite with a Bi:Zn molar ratio of 10%, recorded as 10% BiOI/ZnO nano array composite.

Embodiment 4

Preparation of bismuth iodide oxide/zinc oxide nano array composite (15% BiOI/ZnO), the specific steps are as follows:

Weigh 72.8 mg of bismuth nitrate pentahydrate and 24.9 mg of potassium iodide and dissolve them in 40 ml of ethylene glycol monomethyl ether (the concentration is 3.75 mM), stir vigorously for 25 minutes, move it into the inner tank of the reactor, obliquely insert the ITO glass with zinc oxide nanorod array into the inner tank of the reactor with the conductive surface downward at an angle of about 60°, seal it, and put it into the oven for reaction at 160° C. for 12 hours. After natural cooling, take out ITO glass, wash it with deionized water and ethanol, and dry it in the oven at 60° C. for 6 hours to obtain a composite with a Bi:Zn molar ratio of 15%, recorded as 15% BiOI/ZnO nano array composites.

Figure 2:
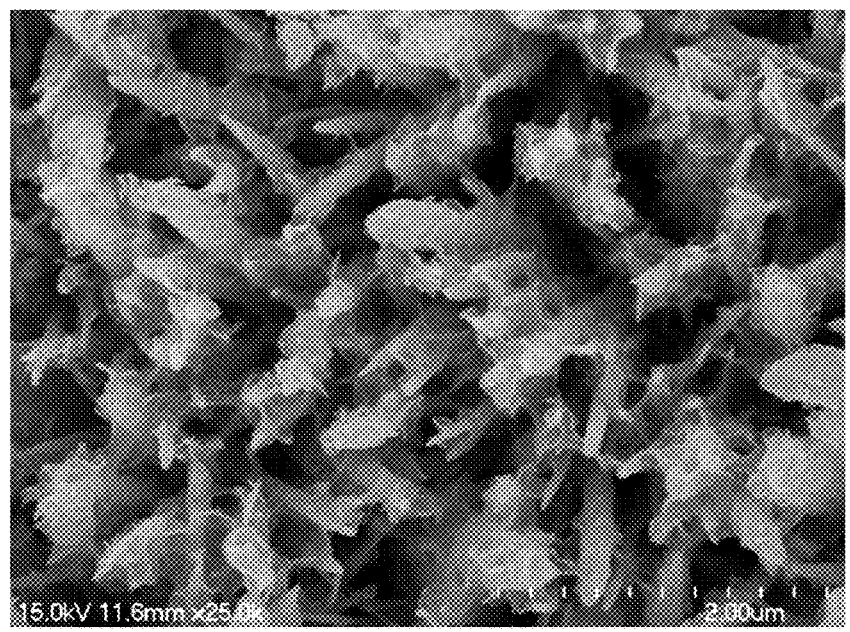
FIG. 2 is a scanning electron microscope diagram of zinc oxide supported bismuth iodide oxide composite (BiOI/ZnO).
Figure 3:
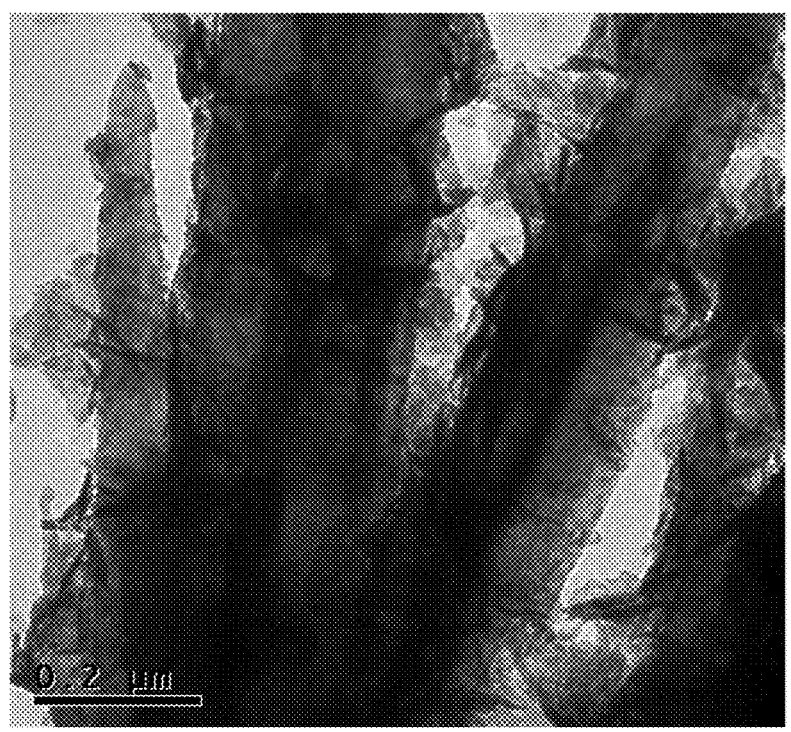
FIG. 3 is a transmission electron microscope diagram of zinc oxide supported bismuth iodide oxide composite (BiOI/ZnO).

FIG. 2 is the SEM diagram of the above BiOI/ZnO nano array composite, and FIG. 3 is the TEM diagram of the above 15% BiOI/ZnO nano array composite. From the above diagram, it can be seen that the small-size layered bismuth iodide oxide is loaded on the surface of zinc oxide nanorods.

Embodiment 5

Preparation of bismuth iodide oxide/zinc oxide nano array composites (20% BiOI/ZnO), the specific steps are as follows:

Weigh 97.0 mg of bismuth nitrate pentahydrate and 33.2 mg of potassium iodide and dissolve them in 40 mL of ethylene glycol monomethyl ether (the concentration is 5.0 mM), stir vigorously for 25 minutes, move it into the inner tank of the reactor, obliquely insert the ITO glass with zinc oxide nanorod array into the inner tank of the reactor with the conductive surface downward at an angle of about 60°, seal it, and put it into the oven for reaction at 160° C. for 12 hours. After natural cooling, take out ITO glass, wash it with deionized water and ethanol, and dry it in the oven at 60° C. for 6 hours to obtain a composite with a Bi:Zn molar ratio of 20%, recorded as 20% BiOI/ZnO nano array composites.

Embodiment 6

Photodegradation experiment of bisphenol A by 15% BiOI/ZnO: take two pieces of composite material 15% BiOI/ZnO obtained in the above embodiment and place them in a test tube containing 7 mL bisphenol A aqueous solution with a concentration of 10 mg/L. Avoid light and absorb for half an hour to reach adsorption equilibrium. After equilibrium, irradiate the catalyst with a 300 W xenon lamp, take 1 mL every 30 minutes, filter it with a filter head, put it into the HPLC sample bottle, use the HPLC to test the absorption curve of the sample in the mobile phase of deionized water:methanol=30:70 at the UV wavelength of 290 nm, record the peak area of bisphenol A at about 6 minutes, and record the initial bisphenol A concentration as 100%, to obtain the photodegradation curve of bisphenol A.

Embodiment 7

Piezoelectric degradation experiment of bisphenol A by 15% BiOI/ZnO: take two pieces of composite material 15% BiOI/ZnO obtained in the above embodiment and place them in a test tube containing 7 mL bisphenol A aqueous solution with a concentration of 10 mg/L. Avoid light and absorb for half an hour to reach adsorption equilibrium. After balancing, place the test tube obliquely in the ultrasonic cleaner, turn on the ultrasonic cleaner, adjust the power to 90 W, take 1 mL every 30 minutes, filter with the filter head, put it into the HPLC sample bottle, use the HPLC to test the absorption curve of the sample at the UV wavelength of 290 nm in the mobile phase of deionized water:methanol=30:70, and record the peak area of bisphenol A at about 6 minutes, and record the initial bisphenol A concentration as 100%, to obtain the piezoelectric degradation curve of bisphenol A.

Embodiment 8

Piezoelectric photodegradation experiment of bisphenol A by 15% BiOI/ZnO: take two pieces of composite material 15% BiOI/znO obtained in the above embodiment and place them in a test tube containing 7 mL bisphenol a aqueous solution with a concentration of 10 mg/L. Avoid light and absorb for half an hour to reach adsorption equilibrium. After balancing, place the test tube obliquely in the ultrasonic cleaner, irradiate the catalyst with a 300 W xenon lamp, turn on the ultrasonic cleaner, adjust the power to 90 W, take 1 ml every 30 minutes, filter with a filter head, and put it into the HPLC sample bottle, an HPLC is used to test the absorption curve of the sample in the mobile phase of the mixed solution of water and methanol (water:methanol=30:70) at the UV wavelength of 290 nm. The peak area of bisphenol A is recorded in about 6 minutes, and the initial concentration of bisphenol A is recorded as 100%. The piezoelectric photodegradation curve of bisphenol A is obtained.

Figure 4:
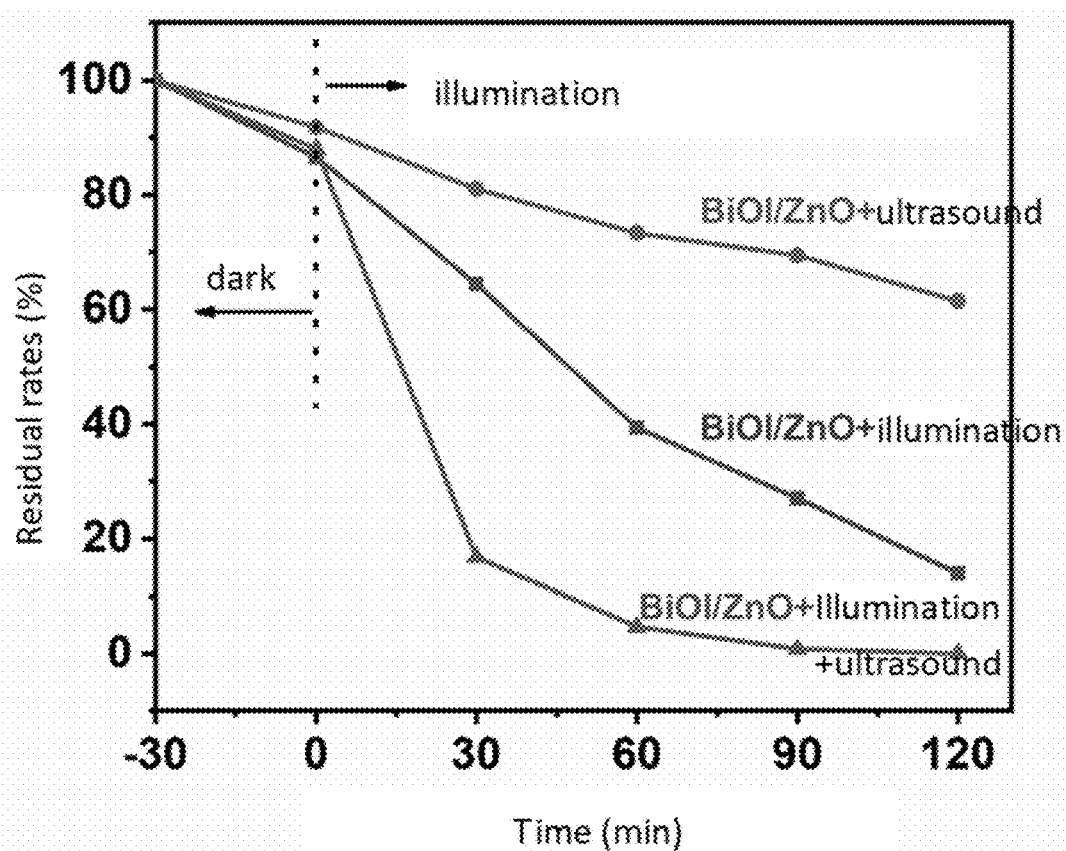
FIG. 4 is an effect diagram of degradation of bisphenol A by zinc oxide supported bismuth iodide oxide composite (BiOI/ZnO).

FIG. 4 shows the degradation curve of bisphenol A in water by 15% BiOI/ZnO. It can be seen from the figure that the piezoelectric photocatalytic performance is the best, and the piezoelectric catalytic effect alone is the worst. After 90 minutes of piezoelectric photocatalytic degradation, bisphenol A in aqueous solution is almost completely degraded, and the residue rate is close to 0.

Using the same test method above, the degradation effects of 10% BiOI/ZnO nano array composites and 20% BiOI/ZnO nano array composites on bisphenol A aqueous solution containing 7 mL and 10 mg/L are tested. At 90 minutes after equilibrium, the residue rates of bisphenol A are 23.2% and 8.5% respectively.

Comparison Example

Using the same test method as embodiment 8, the residue rate of bisphenol A is 65% after the zinc oxide nanorod array of embodiment 2 reaches equilibrium in 90 minutes.

Using the same test method as embodiment 8, the zinc oxide-bismuth iodine oxide prepared in embodiment 1 of CN106525942A is tested. after 90 minutes to reach equilibrium, the residue rate of bisphenol A was 19.9%; It shows that the growth process of BiOI on ZnO has a significant impact on the degradation results.

Weigh 72.8 mg of bismuth nitrate pentahydrate and 24.9 mg of potassium iodide, dissolve them in 40 ml of ethylene glycol methyl ether, stir vigorously for 25 minutes, transfer them into the inner tank of the reactor, seal them, and put them into the oven for reaction at 160° C. for 12 hours. After natural cooling, filter, wash the filter cake with deionized water and ethanol, and dry it in the oven at 60° C. for 6 h to obtain BiOI nanoparticles; Using the same test method as in embodiment 8, the residue rate of bisphenol A is 35.3% after 90 minutes for equilibrium.

The invention discloses a composite material for ultrasonic synergistic visible light catalytic degradation of organic pollutants, and the preparation method and its effective removal of organic pollutants (such as bisphenol A) in water body. Firstly, a zinc oxide seed layer is prepared on ITO conductive glass by spin coating, and then zinc oxide nanorod array is obtained by hydrothermal method. Finally, bismuth iodide oxide nanoparticles are compounded by simple solvothermal method to obtain composite materials (BiOI/ZnO NAs). Zinc oxide is a common photocatalyst. Due to the wide band gap of zinc oxide and only responding to ultraviolet light, its application is limited. The invention first prepares zinc oxide nanorod array. The zinc oxide nanorod array has regular and orderly morphology, so that it has better electron hole pair transmission and diffusion ability and improves its photocatalytic efficiency, with bismuth iodide oxide loaded on it to enhance its response to visible light, a composite material absorbing visible light is obtained. The composite material prepared by the invention can promote the migration of photogenerated electron hole pairs by introducing ultrasonic field assisted photocatalysis, achieve the purpose of rapid and effective degradation of organic pollutants in water, and can be recycled to reduce the cost.

What we claim is:

1. A bismuth iodide oxide/zinc oxide composite, wherein the preparation method of the bismuth iodide oxide/zinc oxide composite comprising the following steps:
   1) annealing a conductive substrate spin-coated with a zinc oxide seed solution and adding it into a precursor solution for reaction to obtain a zinc oxide nanorod array;
   2) placing the zinc oxide nanorod array into a bismuth iodide oxide precursor solution for reaction to obtain the bismuth iodide oxide/zinc oxide composite; and wherein the bismuth iodide oxide/zinc oxide composite has a Bi:Zn molar ratio of 15%, a layered bismuth iodide oxide is loaded on a surface of the zinc oxide nanorod array, and the bismuth iodide oxide/zinc oxide composite degrades bisphenol in an aqueous solution after 90 minutes of piezoelectric photocatalytic degradation.

2. The bismuth iodide oxide/zinc oxide composite according to claim 1, wherein in step (1), the zinc oxide seed solution is composed of zinc salt aqueous solution and amine compound aqueous solution; the precursor solution is composed of water-soluble zinc salt, amine compound and water.

3. The bismuth iodide oxide/zinc oxide composite according to claim 2, wherein the concentration of the zinc salt aqueous solution is (0.14-0.15) g/mL, the concentration of amine compound aqueous solution is (0.07-0.071) g/mL, and the mass ratio of water-soluble zinc salt, amine compound and water in the precursor solution is (0.74-0.75):(0.35-0.36):(100).

4. The bismuth iodide oxide/zinc oxide composite according to claim 1, wherein in step (1), the conductive substrate is indium tin oxide glass; the annealing treatment is to keep the temperature at 300-350° C. for 10-35 minutes in air atmosphere, the heating rate is 4-6° C./min; the reaction is at the temperature of 80-120° C. for 5-9 h.

5. The bismuth iodide oxide/zinc oxide composite according to claim 4, wherein the annealing treatment is to keep the temperature at 320° C. for 30 minutes in air atmosphere, the heating rate is 5° C./min; the reaction is at the temperature of 90° C. for 6 h.

6. The bismuth iodide oxide/zinc oxide composite according to claim 1, wherein in step (2), the bismuth iodide oxide precursor solution is composed of water-soluble bismuth salt, iodine salt and organic solvent; the reaction is at the temperature of 120-180° C. for 10-15 h.

7. The bismuth iodide oxide/zinc oxide composite according to claim 6, wherein the dosage ratio of water-soluble bismuth salt and organic solvent is (48-49) mg: 40 mL; the water-soluble bismuth salt, iodide salt and organic solvent are bismuth nitrate pentahydrate, potassium iodide and ethylene glycol monomethyl ether respectively; the reaction is at the temperature of 160° C. for 12 hours.

* * * * *